G.L. & H.C. Hart,
Steel Trap,
No. 44,721. Patented Oct. 18, 1864.
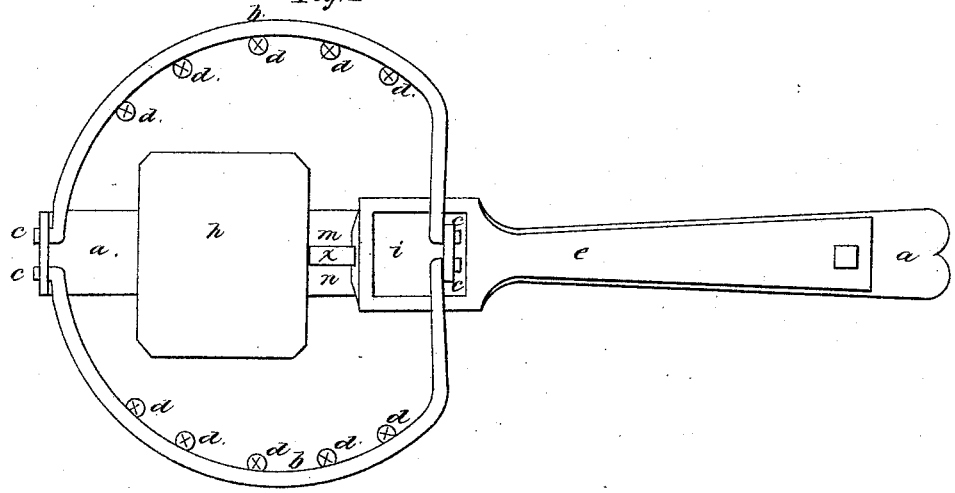
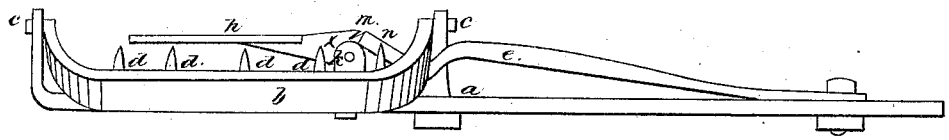
Witnesses:
Inventor:
George L. Hart
Hubert C. Hart

UNITED STATES PATENT OFFICE.

GEORGE L. HART AND HUBERT C. HART, OF UNIONVILLE, CONNECTICUT.

IMPROVEMENT IN ANIMAL-TRAPS.

Specification forming part of Letters Patent No. 44,721, dated October 18, 1864.

*To all whom it may concern:*

Be it known that we, GEORGE L. HART and HUBERT C. HART, both of Unionville, county of Hartford, and State of Connecticut, have invented certain new and useful Improvement in Animal-Traps; and we do hereby declare that the same is described and represented in the following specification and drawings, and to enable others skilled in the art to make and use the same, we will proceed to describe its construction, by referring to the drawings, in which the same letters indicate like parts in each of the figures.

The nature of this improvement will be fully understood from the specification and drawings, in which—

Figure 1 is a top view. Fig. 2 is an edge view.

All parts of this trap are made much in the usual way, except the mode of setting the spring and pan.

$a$ is the frame-work. $b$ are the jaws. $c$ are the fulcrum-pins on which the jaws turn. $d$ are the teeth formed on the jaws. $e$ is the spring, having an opening, $i$, which embraces the shank of the jaws just above the fulcrum-pins $c$. $h$ is the pan, having a joint-piece, $x$, protruding back, and is secured by a pin or screw into the end of the stud $k$. Directly over this pin or screw in the stud $k$ is formed a notch or catch, $m$, which takes hold of or receives the thin or lip edge $n$ of the open end $i$ of the spring. Now, it will be seen that by the use of this improvement the trap is easily and quickly set by simply pressing down the inner end of the spring and lifting the pan so as to receive the thin or lip end $n$ of the spring $e$ into the catch $m$, formed on the joint end of arm $x$ of the pan $h$, directly over the pin or screw, or nearly so, by which it is secured into the stud $k$ then throw open the jaws till they rest upon the open portion $i$ of the spring $e$, and the trap is set, as shown in the drawings.

This trap may be made of any suitable metal and of various sizes, as may be required.

The simplicity, ease of operation, and cheapness of manufacture are among the advantages to be derived from this improvement.

We believe we have thus shown the nature, construction, and operation, so as to enable a person skilled to make and use the same.

We claim as a new article of manufacture—

The combination and arrangement of the frame $a$, jaws $b$, pan $h$, with its catch $m$, and the spring $e$, when the pan is set or held directly by the spring and independently of the jaws, substantially as described.

GEORGE L. HART.
HUBERT C. HART.

Witnesses:
E. R. BURNHAM,
JEREMY W. BLISS.